United States Patent [19]

Nishida et al.

[11] Patent Number: 5,086,315
[45] Date of Patent: Feb. 4, 1992

[54] CAMERA WITH STROBE AND LENS FOR USE THEREWITH

[75] Inventors: Takao Nishida; Osamu Satoh, both of Tokyo, Japan

[73] Assignee: Asahi Kogaku Kogyo Kabushiki Kaisha, Tokyo, Japan

[21] Appl. No.: 412,556

[22] Filed: Sep. 25, 1989

Related U.S. Application Data

[63] Continuation of Ser. No. 148,999, Jan. 27, 1988, abandoned.

[30] Foreign Application Priority Data

Feb. 4, 1987 [JP] Japan ................. 62-22451

[51] Int. Cl.$^5$ .............................................. G03B 15/05
[52] U.S. Cl. ..................................... 354/413; 354/286; 354/149.11
[58] Field of Search ............ 354/413, 471, 473, 127.1, 354/127.11, 127.12, 127.13, 149.1, 149.11, 286

[56] References Cited

U.S. PATENT DOCUMENTS

| | | | |
|---|---|---|---|
| 4,171,887 | 10/1979 | Hayata | 354/127.1 |
| 4,239,360 | 12/1980 | Urano . | |
| 4,258,991 | 3/1981 | Kuraishi | 354/127.13 |
| 4,297,011 | 10/1981 | Adams, Jr. | 354/127.13 |
| 4,477,164 | 10/1984 | Nakai et al. | 354/286 |
| 4,688,921 | 8/1987 | Wakabayashi | 354/127.1 |
| 4,860,113 | 8/1989 | Miyamoto et al. | 354/286 |

FOREIGN PATENT DOCUMENTS

0037538 2/1985 Japan ........................ 354/149.1

*Primary Examiner*—Russell E. Adams
*Attorney, Agent, or Firm*—Sandler, Greenblum, & Bernstein

[57] ABSTRACT

A camera having a camera body with a strobe built therein and at least one photographic lens that is detachably mounted on the camera body. The camera has a strobe use-warning device for warning of the unsuitability of the use of the strobe in the case where the photographic lens mounted on the camera body reduces a quantity of light emitted from the strobe to a value less than a correct quantity of light for irradiating an object, or where a spreading zone of the light from the strobe is narrower than a field of view of the photographic lens. This prevents photographing under inappropriate photographing conditions and the superfluous use of film.

18 Claims, 10 Drawing Sheets

FIG_1A

FIG_1B

FIG_5A

FIG_8A

CAMERA WITH STROBE AND LENS FOR USE THEREWITH

This application is a continuation of application Ser. No. 07/148,999, filed Jan. 27, 1988 now abandoned.

BACKGROUND OF THE INVENTION

This invention relates to a camera having interchangeable lenses and a built-in strobe, and more particularly to a camera having a built-in strobe capable of determining that an object to be photographed is not effectively irradiated by light from the built-in strobe due to an outer shape and a focal length of the particular photographic lens attached to the camera.

One method of photographing a poorly illuminated object is to use a flash strobe. Cameras utilizing strobes are divided into two types; one has a strobe built into the camera while the other has a construction onto which a separately prepared strobe is mounted.

A typical camera having a built-in strobe is a lens shutter camera. With this kind of camera, an outer shape and focal length are not greatly changed. Therefore, it is an easy matter to bring the strobe and the lens into a proper relation in a manner that a photographing zone of the camera or a field of view of the lens is within a spreading zone of the strobe light and the outer shape of the lens does not obstruct the strobe light. Accordingly, there is no trouble in taking flash photography in case of a lens shutter cameras.

On the other hand, using cameras with interchangeable lenses, various lenses are used according to the photographing purpose. Among these photographic lenses, there are lens having large diameters, long overall lengths or different fields of view due to different focal lengths. In the case where a strobe is built into a camera body of a lens interchangeable camera, if the photographic lens mounted on the camera body has a large diameter or a long overall length, part or all of the strobe light incident upon an object may be obstructed by the photographic lens itself. Moreover, in the case of a wide angle lens that is mounted on the camera, a spreading zone of the strobe light may be often narrower than the field of view of the lens.

In the event that photographing if effected under such an objectionable conditions, a required picture could not be obtained, while films are superfluously consumed in any case.

SUMMARY OF THE INVENTION

It is an object of the invention to provide a camera having a built-in strobe which eliminates all the disadvantages of the prior art described above and which is capable of warning of the use of a strobe according to kinds of photographic lens attached to the camera and also prohibiting the use of the strobe.

In order to achieve this object, the strobe built-in camera having a built-in strobe includes a camera body having a strobe built therein and at least one photographic lens that is detachably mounted on the camera. The camera body comprises a strobe use-warning means for warning of the unsuitability of the use of the strobe whether either the photographic lens mounted on the camera body reduces a quantity of light emitted from the strobe to a value less than a correct quantity of light incident upon an object or where a spreading zone of the light from the strobe is narrower than a field of view of the photographic lens.

In carrying out the invention, a strobe use-propriety display unit displays the warning of the unsuitability of the use of the strobe, as well as the completion of the charging of the strobe.

With this arrangement, when an interchangeable lens that is unsuitable for use with the built-in strobe is mounted on the camera, a warning of the unsuitable lens is generated and the flashing of the strobe is prohibited.

The invention will be more fully understood by referring to the following detailed specification and claims taken in condition with the appended drawings.

DETAILED DESCRIPTION OF THE DRAWINGS

The attached drawings illustrate embodiments of the invention schematically within a range sufficient to understand the invention. It is understood that the invention is not limited to those embodiments shown in the drawings with respect to sizes, shapes and positional relations of components of the invention, emphasis instead being placed upon illustrating the principals of the invention. Like components are designated by the same reference numerals throughout the drawings.

A camera having a built-in strobe according to the invention is characterized by a strobe use warning means for warning of the unsuitability of the use of a strobe built into the camera and prohibiting the use of the strobe in the event that a photographic lens mounted on the camera reduces the quantity of strobe light to a value less than a proper quantity for an object, or a spreading zone of the strobe light is narrower than a field of view of the photographic lens. In the first embodiment, such a means is applied to an automatic focusing (AF) camera that includes a lens ROM built-in the lens. However, it should be understood that the invention is applicable to cameras with interchangeable lenses other than the camera in the present embodiment.

Camera Construction

Figure 1A:
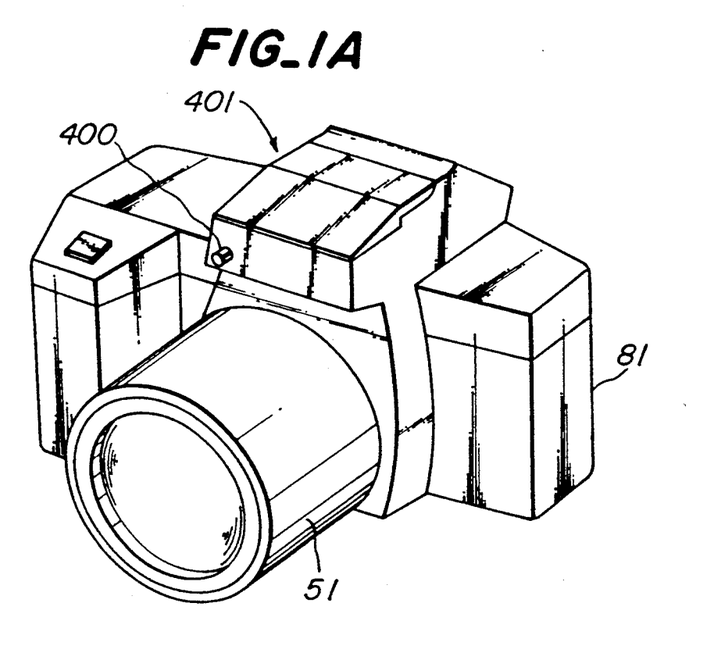
FIGS. 1A and 1B are perspective views of a preferred first embodiment of a camera having a built-in strobe.
Figure 1B:
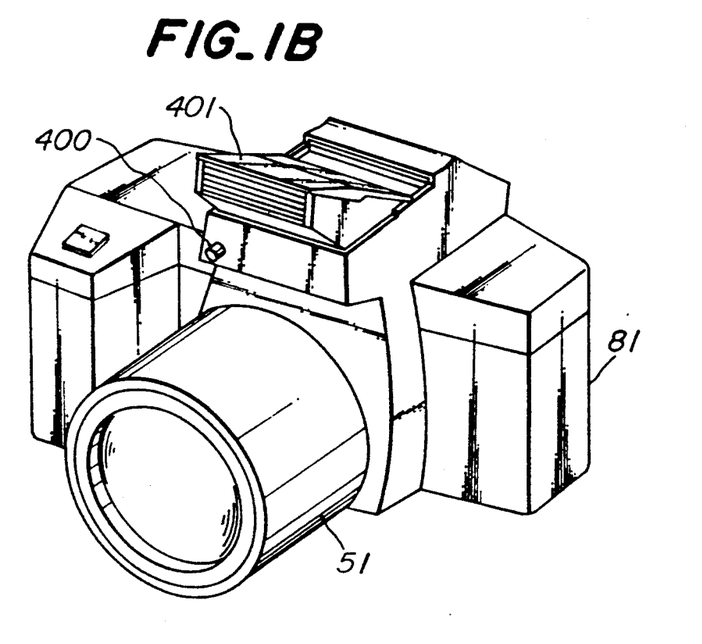

A camera comprises a camera body 81 and a photographing lens 51 that is mounted on the camera body 81. A retractable strobe 401 is built into the camera body 81 at a location above a pentagonal prism and is substantially at a center of the camera so that an object is easily irradiated by light emitted from the strobe. A light emitting portion of the strobe is retracted in the camera body 81 when it is not used. Upon pressing a push button 400, the light emitting portion of the strobe pops up (or extends) out of the camera body 81. Such a built-in strobe is disclosed in U.S. patent application Ser. No. 934,055, incorporated herein, and will not be described in further detail.

Figure 2:
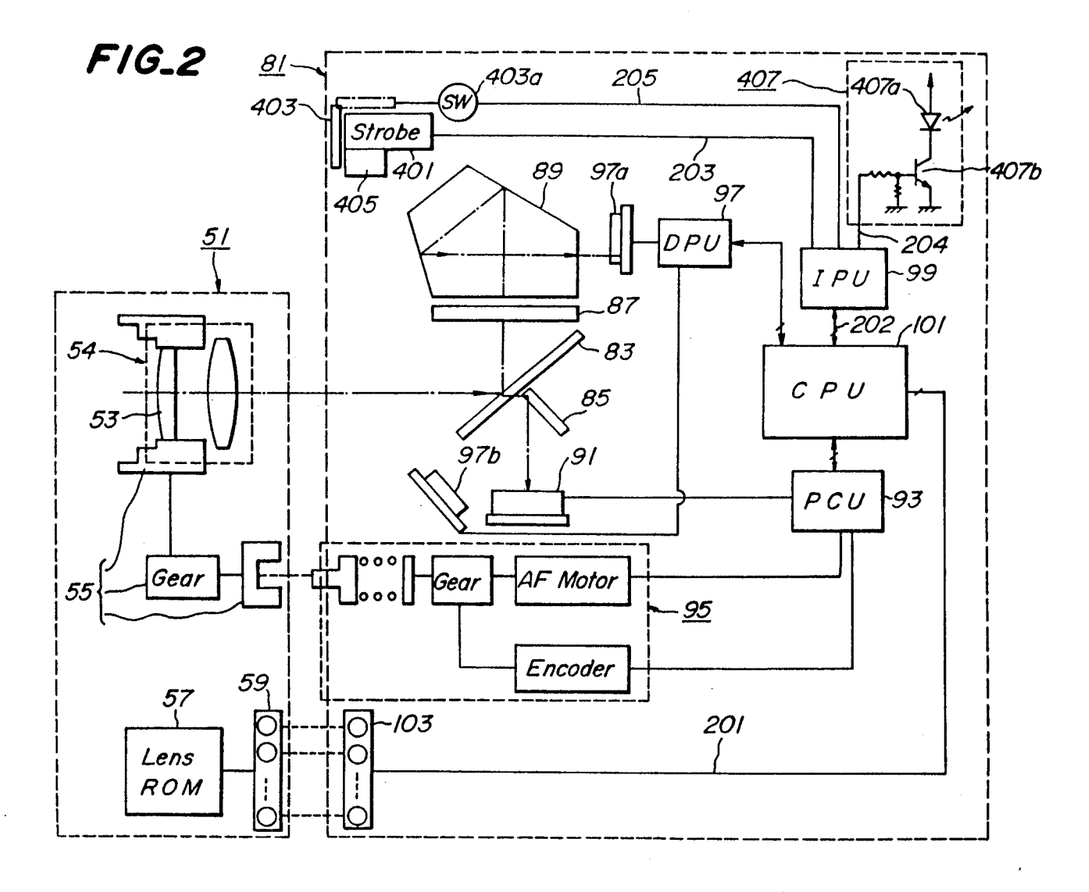
FIG. 2 is a block diagram schematically illustrating the camera of FIGS. 1A and 1B.

FIG. 2 is a block diagram schematically illustrating one example of the camera having a built-in strobe according to the invention. Components which are not essential for an understanding of the invention amount those of the camera and lens will not be described in detail.

A photographic lens 51 is mounted on the camera body 81. The lens 51 may be various ones different in external shape and focal length, according to the photography requirement.

The photographic lens 51 comprises a lens system 54 having a lens 53 that is movable along an optical axis for focusing and a driving force transmission mechanism 55 for transmitting a driving force from a driving source in the camera body 81 to the movable lens 53. The lens system 54 further comprises a lens ROM 57 that contains information to pertaining photographic lens 51, position of the movable lens 53 and a strobe use-propriety means for warning or the use of the strobe built into the camera body. A group of electrical contacts 59 on the lens side electrically connects the photographic lens 51; and the camera body 81.

The camera body 81 has an optical system, such as a main mirror 83, a submirror 85, a focusing screen 87, a pentagonal prism 89 and the like, a pickup portion 91 for automatic focusing, a driving mechanism 95 for driving the movable lens 53 in the lens 51 and an AF control (simply referred to as PCU) 93 for controlling the pickup portion 91 and the driving mechanism 95. Moreover, the camera body 81 comprises light receiving elements 97a and 97b and an AE control (simply referred to as DPU) 97 for AE (automatic exposure controlling), and a display control (simply referred to as IPU) 99 for controlling a display operation indicating the various operations of the strobe and the camera. The camera body 81 further comprises a central processing unit (CPU) 101 for controlling the PCU 93, DPU 97, IPU 99 and lens ROM 57 on the photographic lens side, and a group of electrical contacts 103 on the camera body side, corresponding to the group of electrical contacts 59 on the lens side.

The strobe 401 is built into the camera body 81 at a suitable position, for example on an upper side of a pentagonal prism in the camera body, so as to permit an object to be sufficiently irradiated by the light from the strobe. A cap 403 covers the strobe 401 when it is not used. A shows switch means 403a generates a judgement signal for judging the opened and closed condition of the cap 403 of the strobe 401, which conditions correspond to an operator's intention for using or not using the strobe. In the case that a retractable strobe is built into the camera body 81, the cap 403 is not needed and accordingly, the switch means 403a is designed such that when the retractable strobe is popped up out of the camera body 81, the switch means 403a generates a judgement signal indicating the operator's intention of using the retractable strobe. An auxiliary light emitting portion 405, for automatic focusing, is provided in the proximity of the strobe. A strobe use-propriety display unit 407 displays whether the strobe may be used or not, whose function will be explained later. The display unit 407 in this embodiment comprises a light emitting diode (LED) 407a and a transistor 407b. The LED 407a is positioned at a location, for example in the proximity of the finder of the camera, where an operator can easily notice the LED 407a so that the operator correctly know conditions of the strobe. Moreover, the strobe 401 and the display 407 are controlled by the IPU 99.

Further, the camera is provided at a suitable position on the camera body 81 with a contact (not shown) for connecting an external strobe other than the built-in strobe 401.

STROBE USE - WARNING MEANS

With such a camera constructed as described above, the spreading zone of the light from the built-in strobe is known. It is previously examined which photographic lens or lenses, among a plurality of photographic lenses (interchangeable lenses) to be mounted on the camera, have outer shapes that reduce the quantity of light incident upon an object to a quantity that is less than a proper quantity of strobe light, or which interchangeable lens or lenses have fields of view wider than the spreading zone of the strobe light. As a result, the photographic lenses that are unsuitable for use with the built-in strobe in the camera can be determined.

Moreover, as the above photographic lens 51 has an integral ROM 57, the information whether the photographic lens 51 having the ROM is suitable for use with the built-in strobe is not suitable can be previously stored in part of the lens ROM. This is carried out in the manner that when a predetermined bit in the lens ROM is "1", the strobe can be used with the photographing lens, while when the predetermined bit is "0", the strobe cannot be used with the lens.

Therefore, the photographic lens having the lens ROM 57 with such information stored therein can be used as part of a means for warning the of appropriate use of the built-in strobe, according to specific parameters of photographic lens. In this case, the strobe use-warning means consists mainly of the photographic lens 51, the CPU 101, the IPU 99, switch means 403a generating judgement signals for judging the opened and closed conditions of the cap 403 of the strobe 401, and the strobe use-propriety display unit 407. In the case of a retractable strobe, as has already been explained the switching means 403a generates a signal indicating that the retractable strobe is in the to be used.

Figure 3:
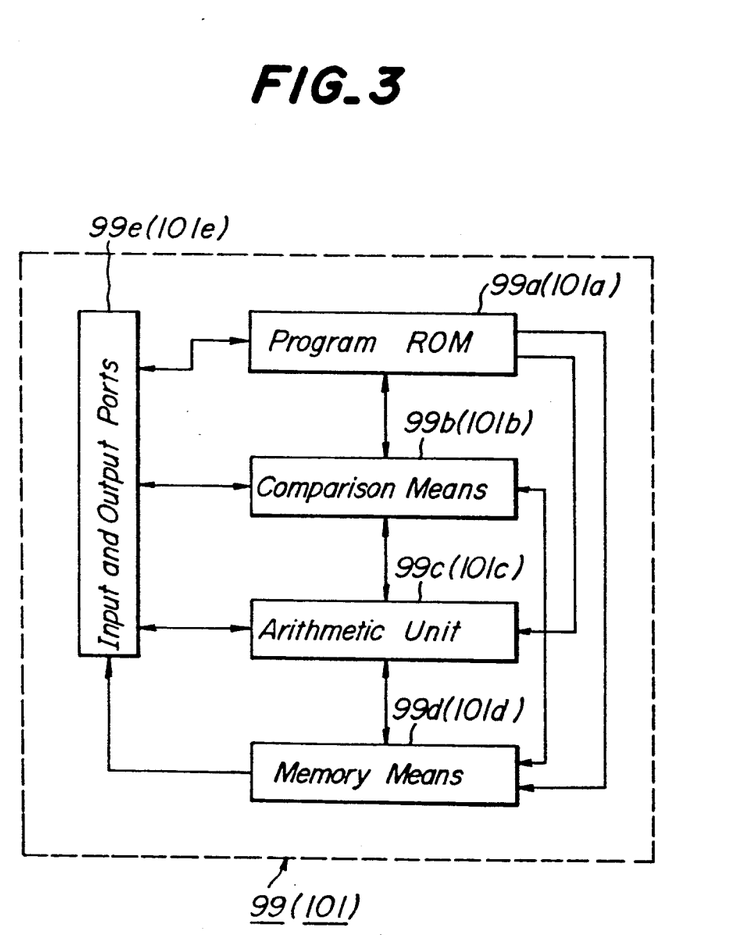
FIG. 3 is a block diagram illustrating functions and means of a CPU and IPU provided in the camera of the preferred embodiment of the invention.

In this embodiment, moreover, the IPU 99 and the CPU 101 are so constructed as to operate in the manner as described hereinafter. FIG. 3 is a block diagram for explaining functions of the IPU 99 and CPU 101. The IPU 99 comprises a program ROM 99a, a comparison means 99b, an arithmetic unit 99c, memory means 99d and input and output ports 99e. The CPU 101 also comprises components similar to all the components of the IPU 99. Connections between the CPU 101 and IPU 99 and between these and other components are met through the input and output ports 99a and 101e.

Moreover, connections between the components of the strobe use-warning means in this embodiment are carried out in the following manner, a signal line 201 between the CPU 101 and the lens ROM 57 transfers a serial clock and serial data. A control line and for example, a four bit bus line typically as shown by 202 interconnects the CPU 101 and the IPU 99. Between the built-in strobe 401 and IPU 99, a signal line 203 is provided for receiving and transmitting strobe charge command signals, charge completion signals, flash command signals and the like. A signal line 204 for display operations is provided between the IPU 99 and the strobe use-propriety display unit 407. Moreover, the operator's intention as to whether he intends to use the strobe or not is transmitted through a signal line 205 to the IPU 99 by switch means 403a. In the example shown in FIG. 2, the switch means 403a generates high and low signals in response to the opening and closing of the cap 403. However, in the case where a retractable strobe is built in the camera body, the switch means 403a generates high or low signals in response to the popping up or retracting of the strobe.

OPERATION OF STROBE BUILT INTO THE CAMERA

Figure 4:
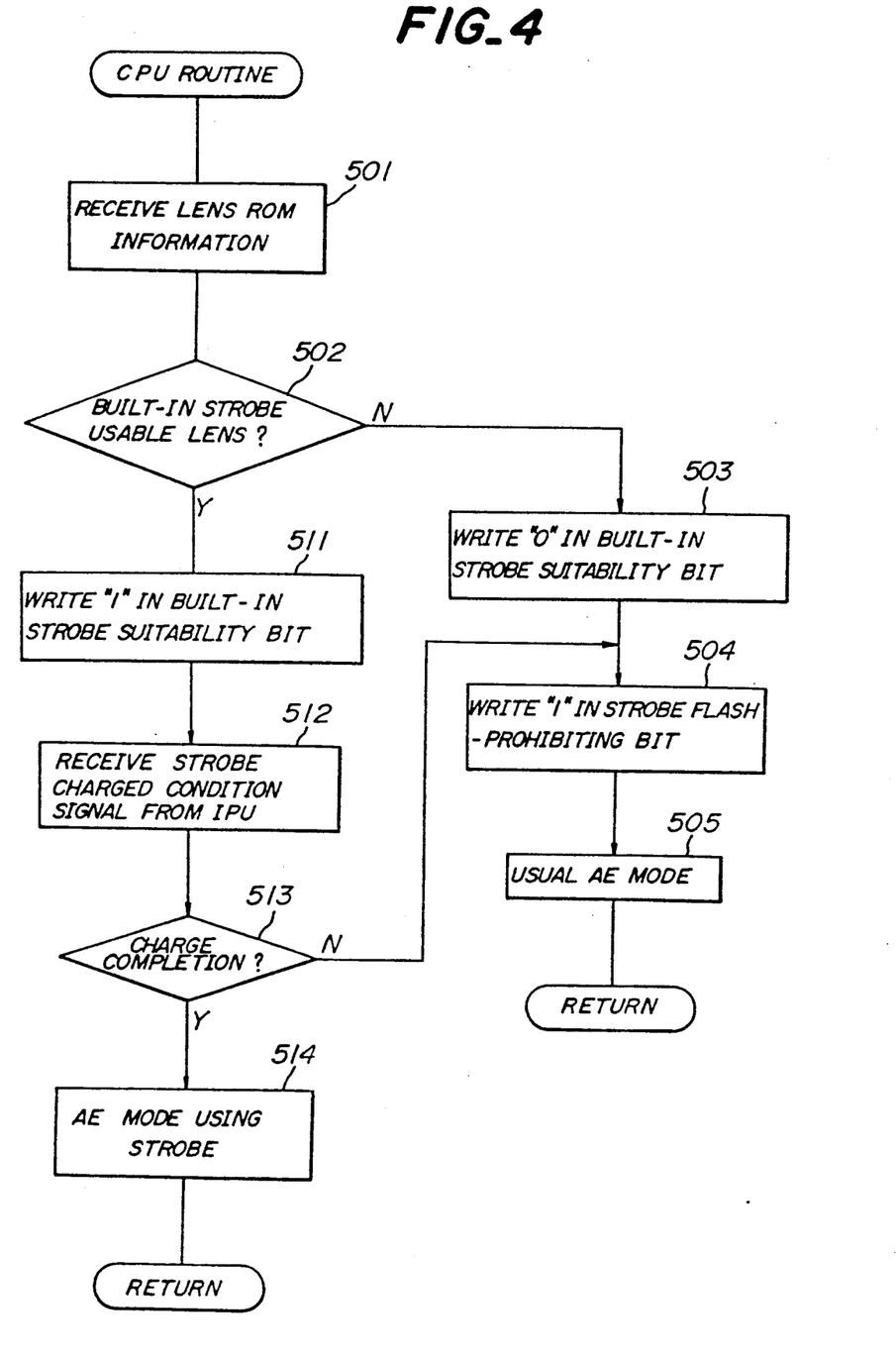
FIG. 4 is a flow diagram illustrating the operations of the CPU of the camera of FIG. 1, particularly associated with the strobe.
Figure 5A:
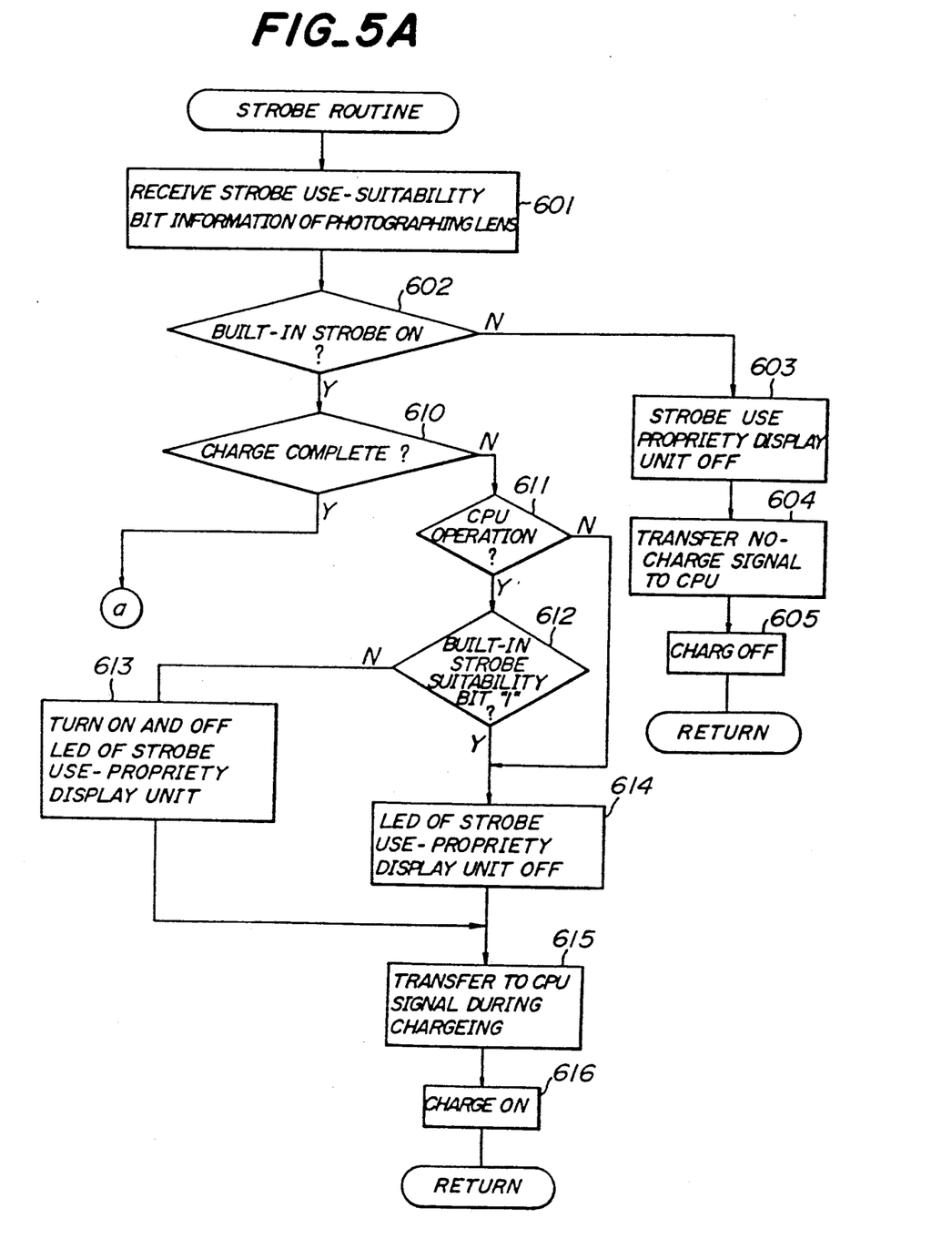
FIGS. 5A and 5B are flow diagrams illustrating the operations of the IPU of the camera of FIG. 1 according to the invention, particularly associated with the strobe.
Figure 5B:
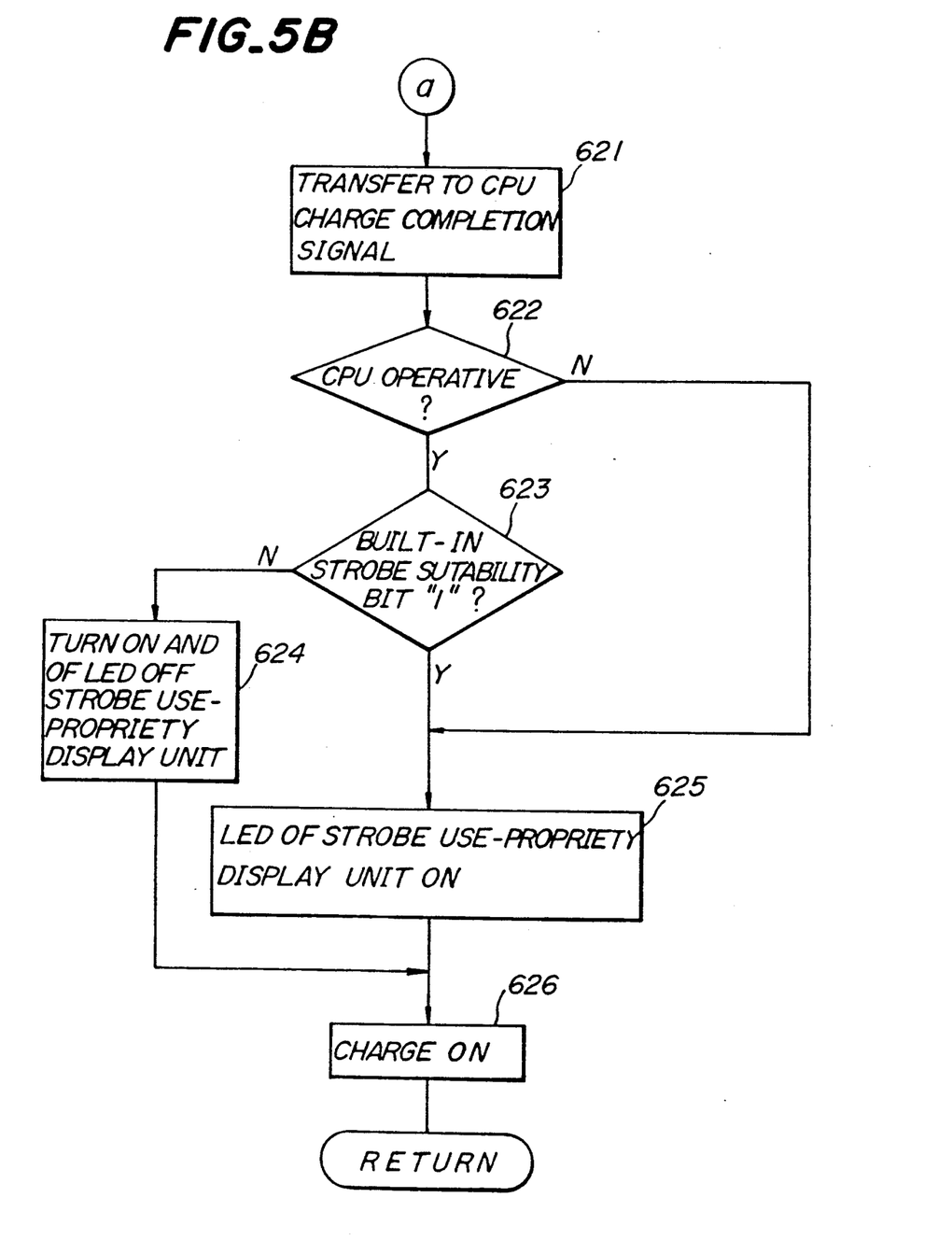

The operation of the strobe built into the camera of the above embodiment, will be explained by referring to FIGS. 2, 4 and 5A and 5B. FIG. 4 is a flow diagram illustrating the operation of program associated with the strobe among programs stored in the CPU 101. FIGS. 5A and 5B are flow diagrams illustrating the operation of programs associated with the strobe among programs stored in the IPU 99. These programs may be stored in the program ROM 99a and 101a of the CPU or IPU.

When a serial clock is fed from the CPU 101 to the lens ROM 57, the CPU 101 receives lens information according to the clock (step 501). This lens information includes information showing whether the strobe built into the camera body may be used with the photographic lens. According to this information, information is written in a built-in strobe use-propriety bit of the memory means 101d in the CPU 101. For example, when the photographic lens capable of using the built-in strobe is mounted on the camera, a "1" is written in the propriety bit (steps 502 and 511). On the other hand, when the photographic lens mounted on the camera is unsuitable for use with the built-in strobe, owing to a shape and focal length of the lens, a "0" is written in the propriety bit (steps 502 and 503). In the latter case, a "1" is written in a strobe flash prohibiting bit in the CPU (step 504).

In the case where a "1" has been written in the strobe flash prohibiting bit in step 504, strobe flashing can be prohibited until the "1" is changed to a "0". Moreover, in the event that a photographic lens is unsuitable for use with the built-in strobe mounted on the camera, a photographing mode can be selected which control an exposure as usual without using the strobe (step 505). Moreover, it is possible to warn of the use of the unsuitable photograph lens so as to avoid erroneously pressing a shutter button, notwithstanding the fact that the unsuitable photographic lens is mounted on the camera. Such a warning is effected mainly with the aid of the IPU 99, which will be explained in detail in connection with the operation of the IPU 99 to be described below.

If the photographic lens 51 mounted on the camera body 81 is suitable for use with the built-in strobe in step 502, the photographing using the strobe is effected, after ascertaining whether the built-in strobe can be used. Such an ascertaining decision is mainly effected with the aid of the IPU 99 photographing with the strobe will be explained in connection with the later explanation of the operation of the IPU 99.

On the other hand, in communication of the IPU 99 with the CPU 101, the memory means in the IPU 99 receives a constant intervals the information of the built-in strobe use-propriety bit from the memory means in the CPU 101 (step 601 refer to FIG. 5A, hereinafter).

Moreover, the IPU 99 judges whether the operator intends to use the built-in strobe (ON condition) or not (step 602). In this embodiment, it has been constructed that when the cap 403 for the strobe is opened, the switch means 403a, made optically, magnetically, mechanically or in other modes, is operated so that an ON signal is inputted into the IPU 99. In the case that a retractable strobe is built in the camera body 81, when the retractable strobe is popped up, the switch means 403a is operated like that described above.

IN THE CASE OF NO INTENTION OF USING THE STROBE

When the built-in strobe 401 is not used (the cap being closed) or when the retractable strobe is retracted in the camera, the strobe use-propriety display unit 407 is off (step 603) and a signal signifying that charging of the strobe has not been effected is transferred from the IPU 99 to the CPU 101 (step 604). Moreover, a charging OFF signal is output from the IPU 99 into the built-in strobe 401 (step 605).

IN THE CASE OF A INTENTION OF USING THE BUILT-IN STROBE

In the case that the built-in strobe 401 is on a judgement of whether the strobe is charged has been completed or not is then effected (step 610). This is accomplished, for example, by the IPU 99 monitoring detection signals from a charge voltage detecting circuit provided in the strobe.

When the charge has not been completed, the judgement whether the CPU 101 actuates or not is first effected (step 611). In this manner, it can be ascertained whether the built-in strobe use-suitability bit information and the strobe flash-prohibiting bit information are correctly memorized in the memory means in the CPU 101.

When the CPU 101 is operating, the judgement whether the photographic lens is suitable for using the built-in strobe is carried out (step 612). At this time, if the strobe use-suitability bit is a "0", the photographing lens mounted on the camera is judged to be unsuitable and the IPU 99 rapidly feeds warning signals of a predetermined period to the strobe use-propriety display unit 407. Therefore, the LED of the strobe use-propriety display unit 407 repeatedly turns on and off to provide a warning so that the operator knows the fact that an unsuitable lens is mounted on the camera. The IPU 99 feeds to the CPU 101 signals indicating the fact that charging is being effected (steps 612, 613 and 615).

When the photographic lens is judged to be suitable for using built-in strobe 401 in step 612 or when the CPU 101 is judged to be inoperative in step 611, the LED turns off in the step 614. Moreover, the IPU 99 feeds to CPU 101 signals indicating the fact that the strobe charging is being effected in step 615.

An operation is then effected for charging the strobe (step 616).

When the completion of charging of the built-in strobe 401 is judged in step 610, the IPU 99 feeds charge completion signals to the CPU 101 (step 621).

Thereafter, a judgement whether the CPU 101 is operating or not is effected (step 622) in a manner similar to step 611.

In the case that the CPU 101 is operating, the judgement whether the photographic lens is suitable for using the built-in strobe is then effected (step 623). If the built-in strobe use-suitability bit is a "0", the LED 407a of the strobe use-propriety display unit 407 turns on and off with a predetermined period, in the same manner as in step 613 so as to warn the operator of the fact that an unsuitable photographic lens has been mounted on the camera (step 624). On the other hand, if the built-in strobe use-suitability bit is a "1", or the CPU 101 is judged to be inoperative, in the step 622, the LED 407a is turned on, thereby informing the operator that the built-in strobe can be used (steps 622, 623 and 625). In this manner, by using one LED 407a of the strobe use-propriety display unit 407, it is possible to display the completion of the charging of the strobe and the prohibition of the use of the strobe. In this case, moreover, the signal for charging the built-in strobe 401 is output from the IPU 99 onto the strobe side in consideration of continuous use of the built-in strobe 401 (step 626).

In contrast with the operation of the IPU 99 the CPU 101 monitors with a predetermined interval the signals with respect to the charged condition of the strobe, i.e. completely charged, charge proceeding or discharged condition (step 512 in FIG. 4). Upon receipt of the signal indicating the completion of the strobe charge from the IPU, the photographing is effected using the built-in strobe under an automatic exposure control (steps 513 and 514 in FIG. 4).

The operations of the IPU 99 and CPU 101 described above are carried out mainly by the arithmetic units 99c and 101c and the comparison means 99b and 101b.

Moreover, the invention is not limited to the above embodiment. For example, information whether the photographic lens is suitable for using the built-in strobe are written in the lens ROM of the photographic lens in the above embodiment. The information may be effected electrically, mechanically or optically other than the method in the present embodiment.

The construction of the strobe flash prohibiting means is not limited to that in the above embodiment. Other means may be used within the scope of the invention.

The aforesaid explanation is given with respect to the first embodiment of the camera. In the first embodiment, the camera is so designed that when the photographic lens is unsuitable for use with the built-in strobe, a warning is provided to the operator and at the same time the actuation of the strobe is automatically inhibited.

SECOND EMBODIMENT

However, in a second embodiment of the present invention, the camera is designed such that, though the warning operation is like that of the first embodiment, the operator can select whether the strobe will operate or not operate, based upon the operator intention.

In the second embodiment, it is preferable that the construction and operation of the camera is partially altered, as described hereinbelow.

Figure 6:
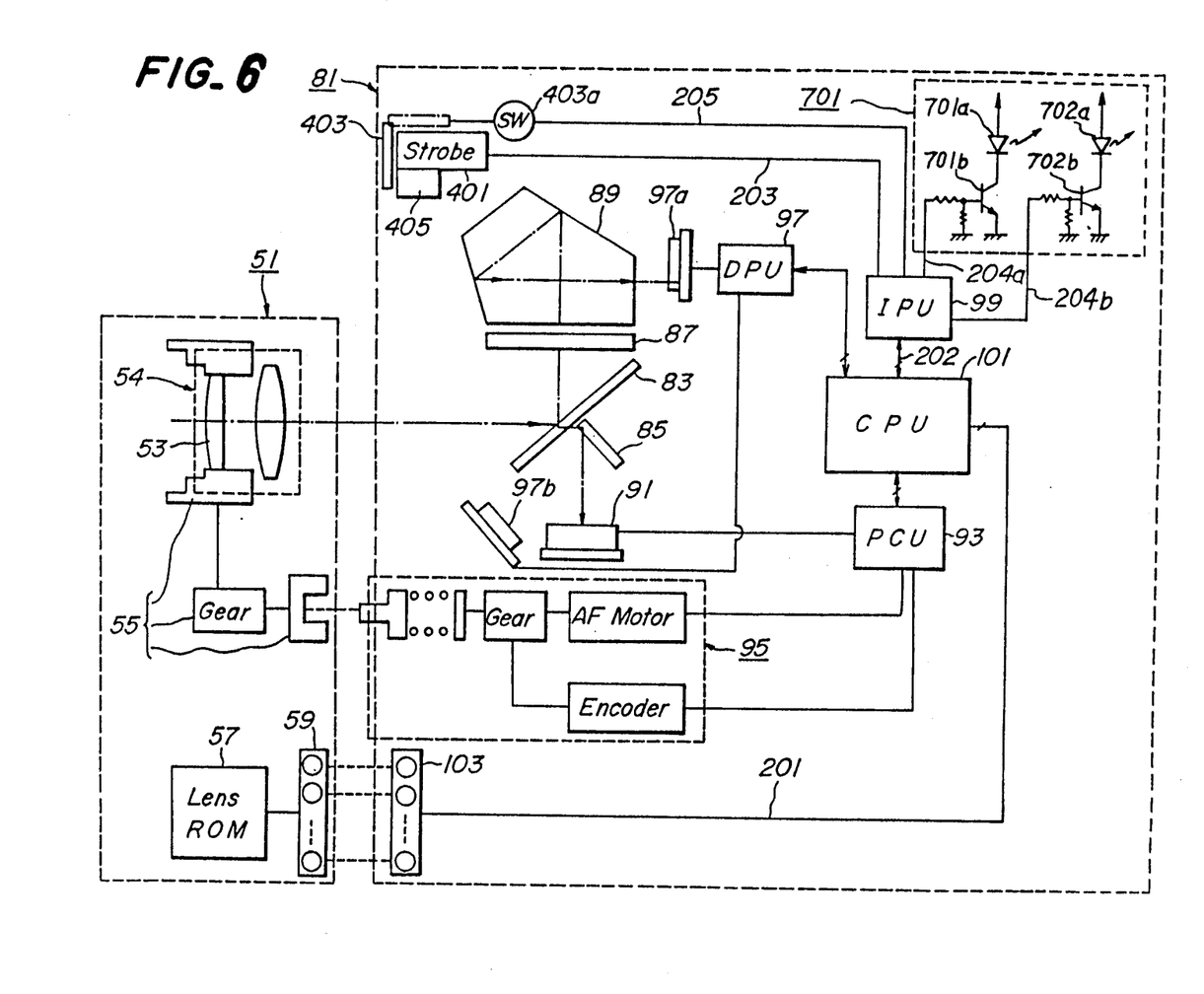
FIG. 6 is a block diagram schematically illustrating a second embodiment of a camera having a built-in strobe.

FIG. 6 is a block diagram showing the second embodiment of the present invention. In this embodiment, it is desired that the warning indication of the unsuitability of a lens and the charge completion indication are required at the same time. To satisfy this requirement, a strobe use-propriety display unit 701 comprises a first indication means (701a, 701b) for the warning indication and a second indication means (702a, 702b) for the charge completion indication, which is different in construction from the strobe use-propriety display unit 407 shown in FIG. 2. The first and second indication means are connected to terminals of the IPU 99. The remaining portion of the construction shown by FIG. 6 is the same as the corresponding portions of the construction of the first embodiment, shown in FIG. 2.

Figure 7:
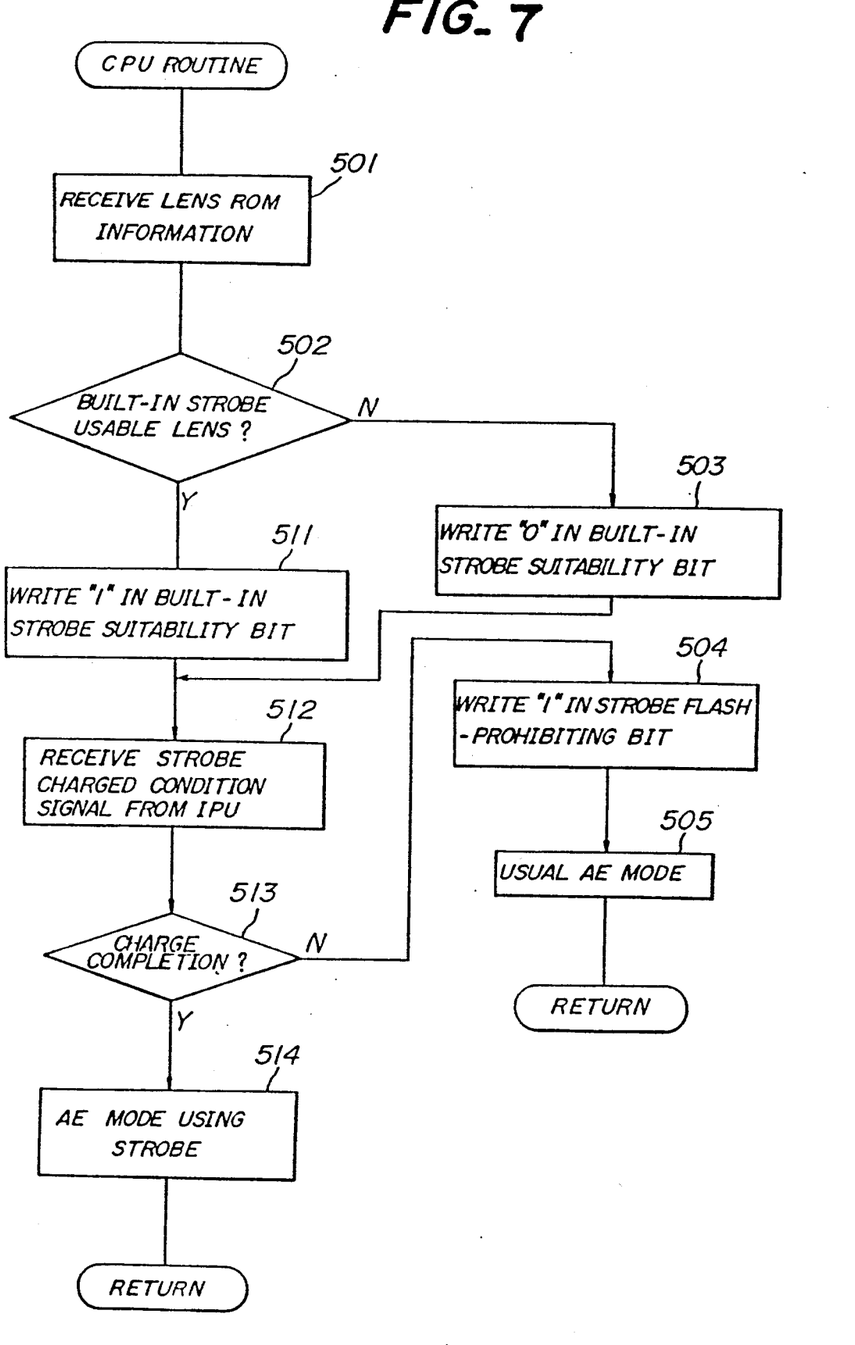
FIG. 7 is a flow diagram illustrating operations of a CPU of the camera of FIG. 6.

FIG. 7 is a flow diagram showing the operation of the CPU according to the second embodiment of the present invention. As already explained with reference to FIG. 4, the operation at step 504 is carried out directly after the operation of the step 503. In second embodiment, however, in order to prevent the automatic inhibitation of the strobe flashing, the operation at step 512 follows step 503. Other portions of the flow of the CPU routine is the same as that of the first embodiment.

Figure 8A:
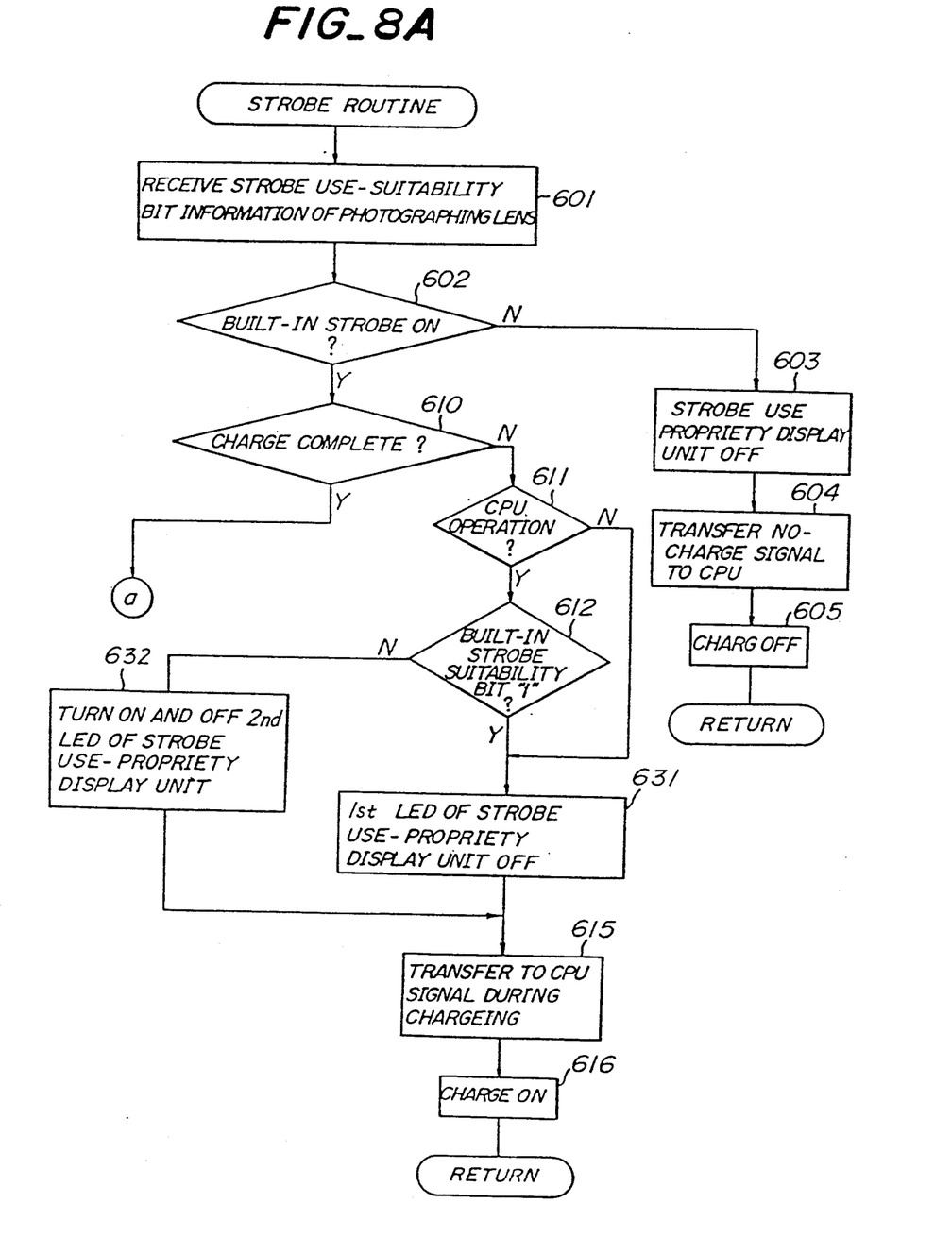
FIGS. 8A and 8B are flow diagrams illustrating the operation of an IPU of the camera of FIG. 6.
Figure 8B:
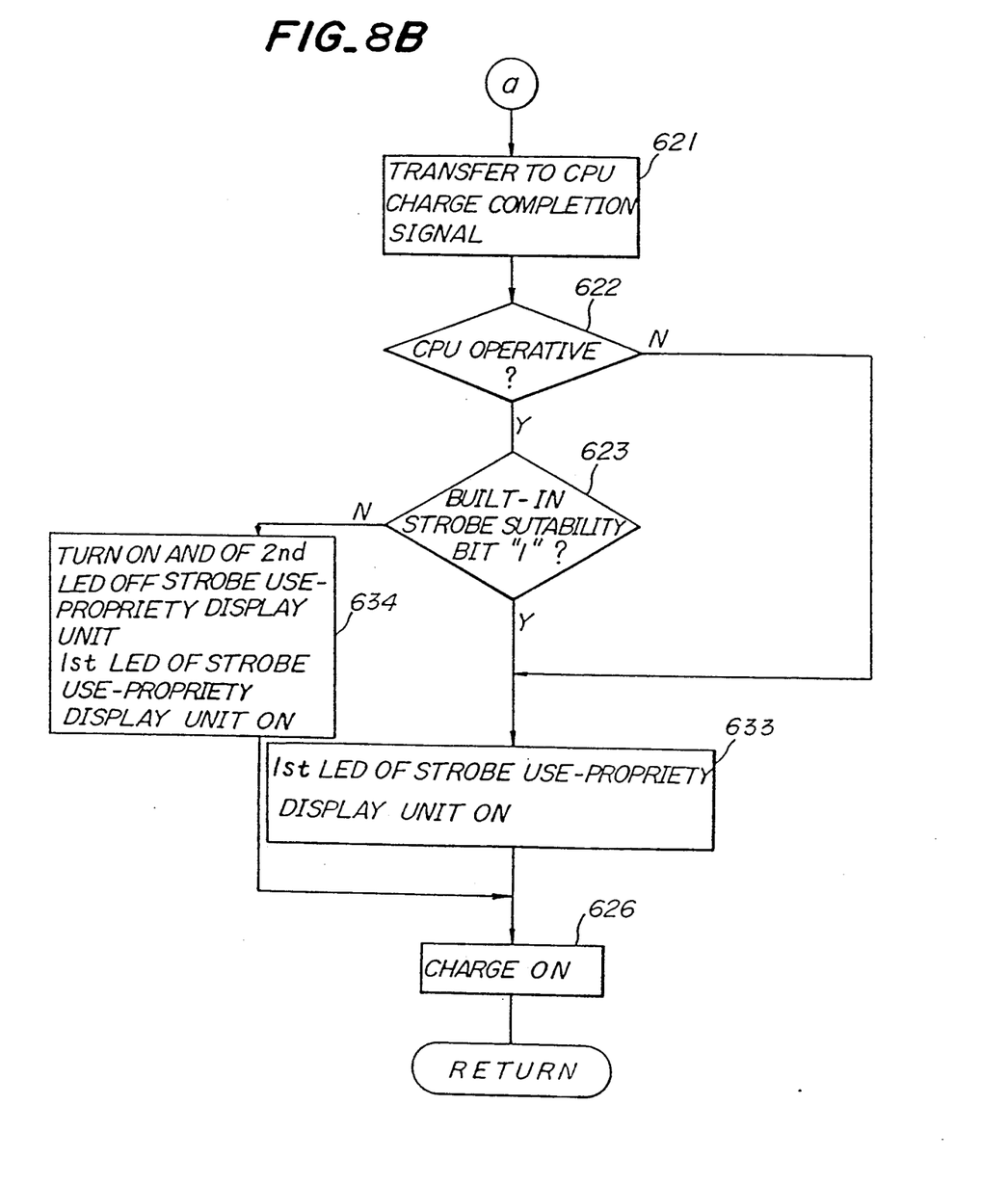

FIGS. 8A and 8B are flow diagrams for explaining the operation according to the strobe routine of the second embodiment. The description will be given to the portions of the flow of the second embodiment which are different from those of the first embodiment.

In the second embodiment, the first indication means (701a, 701b) is turned off at the processing of step 631, shown in FIG. 8A, which corresponds to step 614 of the first embodiment. Further, the second indication means (702a, 702b) is turned on and off at the proceeding of step 632 shown in FIG. 8A, which corresponds to step 613 of the first embodiment. The first indication means is turned on at the processing of step 633, shown in FIG. 8B, which corresponds to step 625 of the first embodiment. The first indication means is turned on and at the same time the second indication means is turned off at the processing of step 634 shown in FIG. 8B, which corresponds to step 624 of the first embodiment. The remaining portions of the flow, other than that described above, is the same as that of the first embodiment.

As can be seen from the above explanation, the strobe built-in camera according to the invention is capable of warning that the photographic lens mounted on the camera is unsuitable for use with the built-in strobe and moreover, prohibits the flashing of the built-in strobe, when the photographic lens to be used will interrupt part or all of strobe light incident upon an object, owing to a large diameter or long length of the lens, or the photographic lens has a field of view wider than the spreading zone of the strobe light.

Therefore, photographing under inappropriate photography conditions is prevented and superfluous use of films can be avoided.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A photographic lens that is detachably mountable on a single-lens reflex camera, said photographic lens comprising a photographic lens system and a memory for storing in said photographic lens information that warns a photographer of an unsuitability of using a strobe when said photographic lens mounted on said camera body reduces a quantity of light emitted from said strobe to a value less than a quantity of light incident to an object to be photographed.

2. A photographic lens as set forth in claim 1, wherein said memory means comprises a ROM located in said lens.

3. A camera as set forth in claim 1, wherein said strobe is integrally connected to said camera body.

4. A camera as set forth in claim 1, wherein said strobe is built into said camera body.

5. A camera and strobe, comprising:
a camera body;
a strobe that is usable with said camera body;
a photographic lens that is detachably mounted to said camera body; and
a strobe-use warning means for warning of an unsuitability of the use of said strobe when said lens mounted on said camera reduces a quantity of light emitted from said strobe to a value less than a quantity of light for illuminating an object to be photographed.

6. The camera of claim 5, further comprising a strobe use-propriety display unit for displaying a warning of the unsuitability of the use of said strobe and for displaying the completion of charging of said strobe.

7. A camera as set forth in claim 6, wherein said strobe use-propriety display unit comprises a first indication means for warning of the unsuitability of the use of said strobe and a second indication means for the charge indicating the completion of said charging of said strobe.

8. A camera as set forth in claim 7, wherein said strobe use-warning means is operative to prohibit the use of said strobe when said second indication means indicates the completion of said charging of said strobe while said first indication means warns of the unsuitability of the use of said strobe.

9. The camera of claim 5, wherein said strobe use-warning means prohibits the use of said strobe when said strobe use-warning means warns of the unsuitability of the use of said strobe.

10. The camera of claim 5, wherein said strobe use-warning means comprises:
a strobe use-propriety display unit;
a memory located in said photographic lens, said memory storing information pertaining to said photographic lens for warning of the unsuitability of the use of said strobe;
a central controller for receiving said information from said memory;
a means for generating a signal indicating the intention of using said strobe; and
a display controller that causes said strobe use-propriety display unit to display a warning based on said information received from said central controller when said means generates said signal indicating the intention of using said strobe.

11. The camera of claim 10, wherein said strobe use-propriety display unit comprises:
a light emitting diode and transistor circuit; and
a warning signal that is periodically supplied to said transistor from said display controller in response to said information received by said central controller to cause said light emitting diode to alternately flash on and off so as to display the unsuitability of using said strobe.

12. The camera of claim 10, wherein said warning display is activated when said display controller has determined that said strobe is charged and said information received by said central controller determines it is unsuitable to use said strobe.

13. The camera of claim 11, wherein said warning display is activated when said display controller has determined that said strobe is charged and said information received by said central controller determined it is unsuitable to use said strobe.

14. The camera of claim 10, wherein said means for generating said signal indicating the intention of using said strobe is activated by moving said strobe to an open position.

15. The camera of claim 10, wherein said strobe comprises a retractable strobe, said means for generating said signal indicating the intention of using said retractable strobe generates said signal when said retractable strobe is popped up out of said camera body.

16. The camera of claim 15, wherein said means for generating said signal comprises a switch.

17. The camera of claim 5, wherein said strobe is integrally connected to said camera body.

18. The camera of claim 5, wherein said strobe is built into said camera body.

* * * * *

UNITED STATES PATENT AND TRADEMARK OFFICE
CERTIFICATE OF CORRECTION

PATENT NO. : 5,086,315
DATED : February 4, 1992
INVENTOR(S) : T. NISHIDA et al.

It is certified that error appears in the above-indentified patent and that said Letters Patent is hereby corrected as shown below:

On the title page, in section [56], References Cited line 5, change "Nakai etal." to ---Nakai et al.---.

At column 10, line 37 (claim 13, line 4), change "determined" to ---determines---.

Signed and Sealed this

Seventeenth Day of September, 1996

Attest:

BRUCE LEHMAN

Attesting Officer     Commissioner of Patents and Trademarks

BEST AVAILABLE COPY